(12) United States Patent
Roh et al.

(10) Patent No.: US 7,437,226 B2
(45) Date of Patent: Oct. 14, 2008

(54) METHOD OF CONSTRUCTING ARTIFICIAL MARK FOR AUTONOMOUS DRIVING, APPARATUS AND METHOD OF DETERMINING POSITION OF INTELLIGENT SYSTEM USING ARTIFICIAL MARK AND INTELLIGENT SYSTEM EMPLOYING THE SAME

(75) Inventors: Kyung-shik Roh, Seongnam-si (KR); Woo-sup Han, Yongin-si (KR); Woong Kwon, Seongnam-si (KR); Young-bo Shim, Seoul (KR); Yeon-taek Oh, Yongin-si (KR); Ki-cheol Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 10/919,493

(22) Filed: Aug. 17, 2004

(65) Prior Publication Data

US 2005/0228555 A1 Oct. 13, 2005

(30) Foreign Application Priority Data

Aug. 20, 2003 (KR) .................. 10-2003-0057727
Aug. 9, 2004 (KR) .................. 10-2004-0062604

(51) Int. Cl.
*G01C 22/00* (2006.01)
*G05D 1/00* (2006.01)

(52) U.S. Cl. .................. 701/25; 702/85; 700/245

(58) Field of Classification Search .................. 701/25; 702/85; 700/245
See application file for complete search history.

(56) References Cited

U.S. PATENT DOCUMENTS 5,525,883 A 6/1996 Avitzour (Continued)

FOREIGN PATENT DOCUMENTS

EP 0 881 333 A1 12/1998

(Continued)

OTHER PUBLICATIONS

Fisher, Bob. Projective Invariants, Nov. 7, 1997, available @ http://homepages.inf.ed.ac.uk/rbf/CVonline/LOCAL_COPIES/BEARDSLEY/node4.html, last accessed Sep. 20, 2006.*

(Continued)

*Primary Examiner*—James P. Trammell
*Assistant Examiner*—Daniel L Greene
(74) *Attorney, Agent, or Firm*—Sughrue Mion, PLLC (57) ABSTRACT

A method for constructing an artificial mark for autonomous driving of an intelligent system, an apparatus and method for determining the location of an intelligent system using the artificial mark, and an intelligent system employing the same. The apparatus and method for determining the location of an intelligent system includes a projective invariant calculator which calculates a projective invariant of an artificial mark detected from an image taken for a driving place; a search unit which stores a database of indices according to a combination of colors of polygons included in the artificial mark, projective invariants of the artificial marks, and global location information of the artificial marks in the driving place, and searches the database by the calculated projective invariant for obtaining the global location information of the detected artificial mark; and a position information analyzer which analyzes the position of the intelligent system by using the global location information of the detected artificial mark and location information between the intelligent system and the detected artificial mark.

5 Claims, 12 Drawing Sheets

U.S. PATENT DOCUMENTS

| | | | | |
|---|---|---|---|---|
| 5,598,515 | A | * | 1/1997 | Shashua ..................... 345/422 |
| 5,832,400 | A | * | 11/1998 | Takahashi et al. ............. 701/53 |
| 5,920,320 | A | * | 7/1999 | Shimizu ..................... 345/422 |
| 5,960,057 | A | * | 9/1999 | Majewski et al. ............. 378/62 |
| 6,169,572 | B1 | * | 1/2001 | Sogawa ...................... 348/113 |
| 6,275,613 | B1 | * | 8/2001 | Aiger ........................ 382/195 |
| 6,493,614 | B1 | | 12/2002 | Jung |
| 2002/0186897 | A1 | * | 12/2002 | Kim et al. ................... 382/288 |

FOREIGN PATENT DOCUMENTS

| | | |
|---|---|---|
| JP | 60157611 A | 8/1985 |
| JP | 2001-159519 A | 6/2001 |

OTHER PUBLICATIONS

Fisher, Bob. Projective Transformations, Nov. 7, 1997, available @ http://homepages.inf.ed.ac.uk/rbf/CVonline/LOCAL_COPIES/BEARDSLEY/node3.html#SECTION00030000000000000000, last accessed Sep. 20, 2006.*

* cited by examiner

OBJECT POINT
$P_i = (X_i, Y_i, 1)$  $i = 1\sim5$

IMAGE POINT
$q_i = (x_i, y_i, f)$  $i = 1\sim5$

| # | SHAPE | PROJECTIVE INVARIANT | # | SHAPE | PROJECTIVE INVARIANT |
|---|---|---|---|---|---|
| 1 |  | 3.4546, 2.4546 | 5 |  | 1.4074, 0.40741 |
| 2 |  | −0.6875, 1.6875 | 6 |  | −0.4074, 0.5926 |
| 3 |  | −1.4546, −2.4546 | 7 |  | 0.5926, −0.4074 |
| 4 |  | 1.4074, 0.4074 | 8 |  | 0.4074, 1.4074 |

METHOD OF CONSTRUCTING ARTIFICIAL MARK FOR AUTONOMOUS DRIVING, APPARATUS AND METHOD OF DETERMINING POSITION OF INTELLIGENT SYSTEM USING ARTIFICIAL MARK AND INTELLIGENT SYSTEM EMPLOYING THE SAME

BACKGROUND OF THE INVENTION

This application claims the priority of Korean Patent Application Nos. 2003-57727, filed on Aug. 20, 2003 and 2004-62604, filed on Aug. 9, 2004, in the Korean Intellectual Property Office, the disclosure of which is incorporated herein in its entirety by reference.

1. Field of the Invention

The present invention relates to a method for constructing an artificial mark for autonomous driving of an intelligent system, an apparatus and method for determining the position of an intelligent system using the artificial mark, and an intelligent system employing the same.

2. Description of the Related Art

As intelligent systems such as unmanned aerial vehicles, unmanned vehicle systems, mobile robots, intelligent transportation systems have been attracting increasingly more attentions recently, research and development activities for the systems are briskly performed. In particular, a variety of methods have been suggested for localization method by which an intelligent system recognizes its location. For localization, global positioning systems are used outdoors, while tools such as guided rails, active landmarks, passive landmarks, and natural landmarks are usually used indoors. Among the indoor localization tools, maintenance and management of guided rails, active landmarks, and natural landmarks are difficult and less practical and therefore the passive landmarks are widely used.

Regarding the passive landmarks, a variety of shapes have been suggested. As the most representative case among them, there is a method by which a quadrangle plane with a predetermined size is divided into a predetermined number of smaller quadrangles, then the smaller quadrangles are binarized, and according to the binary codes of a mark, place information or direction information is indicated. However, if this passive marks are used, it takes much time for an intelligent system to pick up an image and detect a next mark, and because of colorless shapes, distinctive power is degraded. In addition, a camera installed in the intelligent system can provide inaccurate location information depending on the location at which the camera finds a mark such that there are restrictions in using the marks.

SUMMARY OF THE INVENTION

The present invention provides a method for generating an artificial mark which can be detected from an image taken by a camera installed in an intelligent system regardless of a location at which the camera looks at the artificial mark.

The present invention also provides an apparatus and method for determining the location of an intelligent system using an artificial mark which can be detected from an image taken by a camera installed in the intelligent system regardless of a location at which the camera looks at the artificial mark.

The present invention also provides an intelligent system employing the apparatus and method for determining a location using the artificial mark.

According to an aspect of the present invention, there is provided a method for constructing an artificial mark, comprising: providing a plane with a first color; and arranging a plurality of polygons in the plane, which have colors different from the first color and different to each other, wherein the artificial mark is discriminated from each other according to a combination of the colors.

According to another aspect of the present invention, there is provided an apparatus for determining a position of an intelligent system including: a projective invariant calculator which calculates a projective invariant of an artificial mark detected from an image taken for a driving place; a search unit which stores a database of indices according to a combination of colors of polygons included in the artificial mark, projective invariants of the artificial marks, and global location information of the artificial marks in the driving place, and searches the database by the calculated projective invariant for obtaining the global location information of the detected artificial mark; and a position information analyzer which analyzes the location of the intelligent system by using the global location information of the detected artificial mark and location information between the intelligent system and the detected artificial mark.

According to still another aspect of the present invention, there is provided a method of determining a position of an intelligent system including: providing a database of indices according to a combination of colors of polygons included in the artificial mark, projective invariants of the artificial marks; calculating a projective invariant of an artificial mark detected from an image taken for a driving place and searching the database by the calculated projective invariant for obtaining the global location information of the detected artificial mark; and analyzing the position of the intelligent system by using the global location information of the detected artificial mark and location information between the intelligent system and the detected artificial mark.

According to yet still another aspect of the present invention, there is provided an intelligent system including: an image pickup unit which pickups an image taken for a driving place; a main control unit which calculates a projective invariant of an artificial mark detected from an image taken for a driving place and analyzes the position of the intelligent system using global location information of the detected artificial mark in the driving place obtained by the calculated projective invariant and location information between the intelligent system and the detected artificial mark; and a driving control unit which controls driving of the intelligent system according to the location information of the intelligent system analyzed in the main control unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining preferred embodiments of the invention with reference to the attached drawings.

Figure 1A:
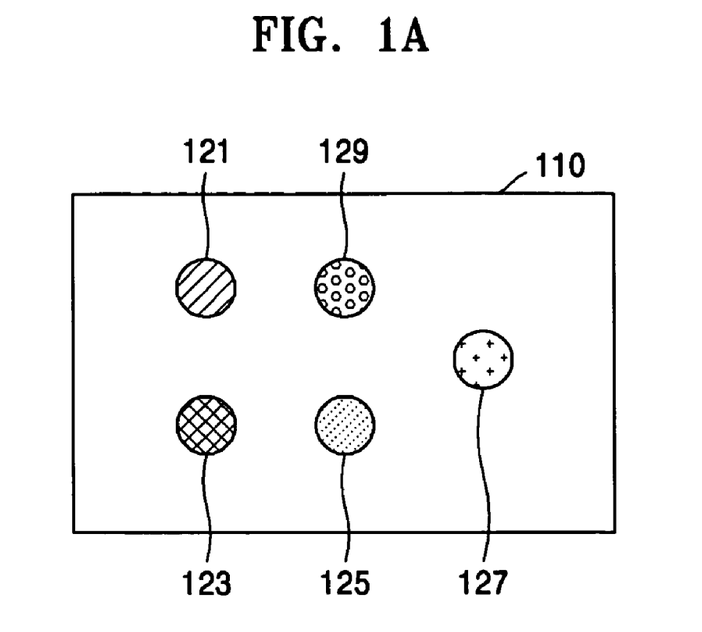
FIGS. 1A and 1B are diagrams showing the shape of an artificial mark according to a first and a second preferred embodiments of the present invention, respectively.
Figure 1B:
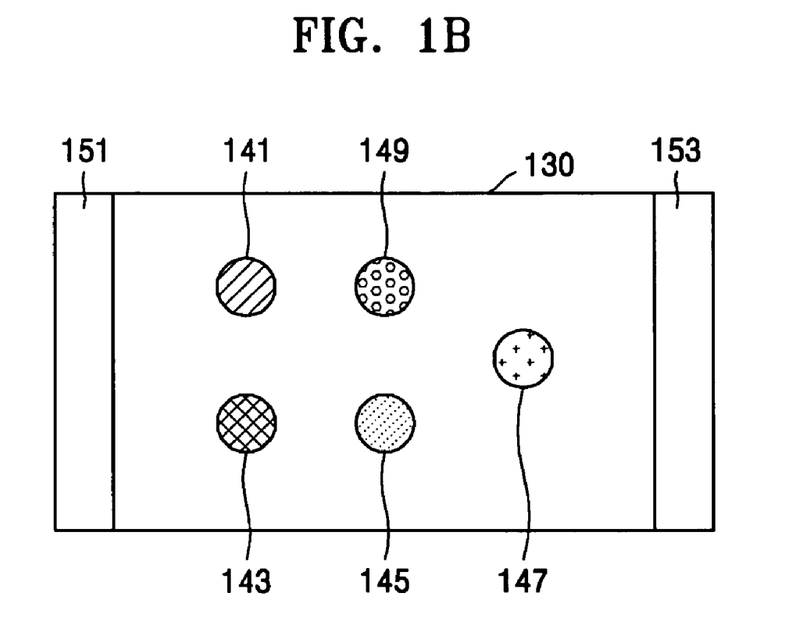

FIGS. 1A and 1B are diagrams showing the shape of an artificial mark according to a first and a second preferred embodiments of the present invention, respectively. The artificial mark shown in FIG. 1A is formed with first through fifth polygons 121 through 129 that are arranged 2-dimensionally on a plane board 110 with a predetermined height (H) and width (W), and have colors different to each other. The plane board 110 has a color different from the colors of the first through fifth polygons 121 through 129. Here, the shapes of the first through fifth polygons 121 through 129 are round and the number of polygons is 5, but the mark is not limited to this and the number of arbitrary polygons may be properly determined. Also, the quadrangle shape of the plane board 110 is shown as an example here, but it does not matter whether or not the shape is round. Here, by changing the arrangement order of the first through fifth polygons 121 through 129, 120 (=5!) shapes can be expressed.

The artificial mark shown in FIG. 1B is formed with first through fifth polygons 141 through 149 that are arranged on a plane board 130 with a predetermined height (H) and width (W), and have colors different to each other, and side quadrangles 151 and 153 disposed on both sides of the plane board 130. The plane board 130 has a color different from the colors of the first through fifth polygons 141 through 149. The side quadrangles 151 and 153 have an identical color that is different from the colors of the plane board 130 and the first through fifth polygons 141 through 149. As the first embodiment shown in FIG. 1A, in FIG. 1B, the shapes of the first through fifth polygons 141 through 149 are round and the number of polygons is 5, but the mark is not limited to this and the number of arbitrary polygons may be properly determined.

Figure 2A:
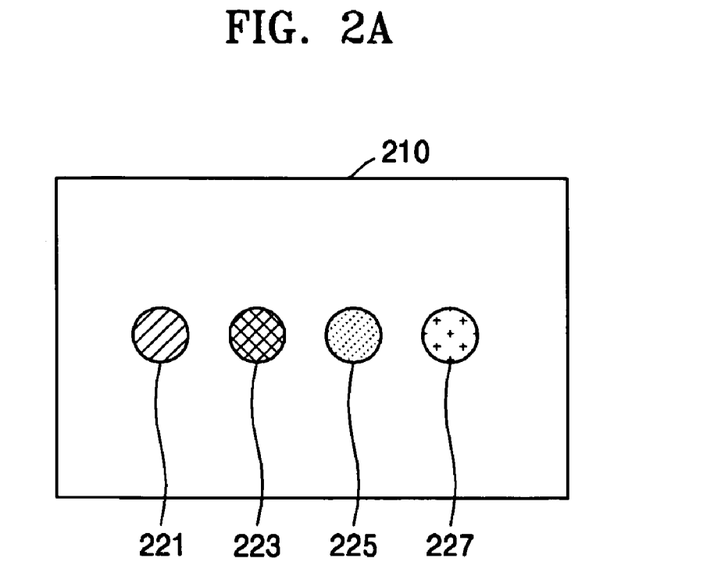
FIGS. 2A and 2B are diagrams showing the shape of an artificial mark according to a third and a fourth preferred embodiments of the present invention, respectively.
Figure 2B:
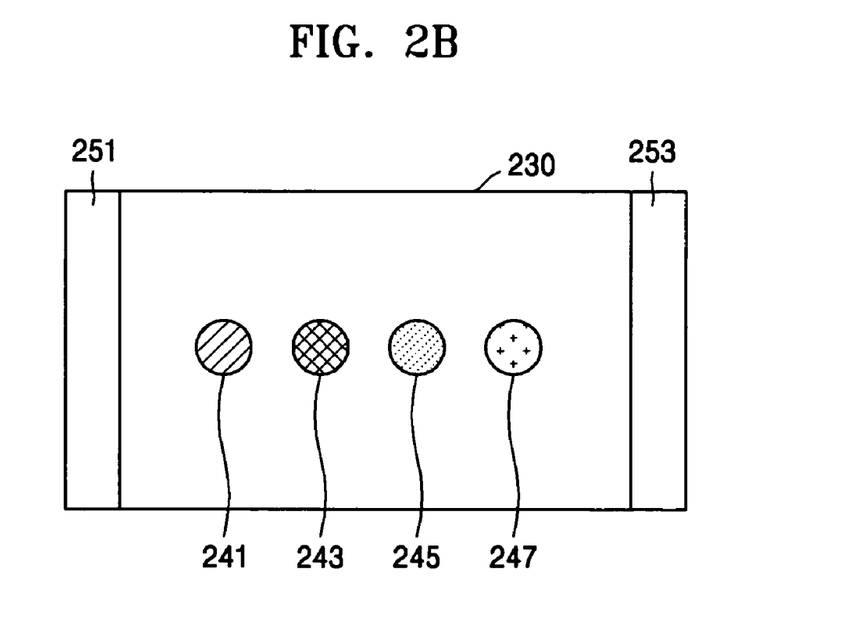

FIGS. 2A and 2B are diagrams showing the shape of an artificial mark according to a third and a fourth preferred embodiments of the present invention, respectively. The artificial mark shown in FIG. 2A is formed with first through fourth polygons 221 through 227 that are arranged one-dimensionally on a plane board 210 with a predetermined height (H) and width (W), and have colors different to each other. As the first and second embodiments shown in FIGS. 1A and 1B, in FIG. 2A, the shapes of the first through fourth polygons 221 through 227 are round and the number of polygons is 4, but the mark is not limited to this and the number of arbitrary polygons may be properly determined. Here, by changing the arrangement order of the first through fourth polygons 221 through 227, 24 (=4!) shapes can be expressed.

The artificial mark shown in FIG. 2B is formed with first through fourth polygons 241 through 247 that are arranged one-dimensionally on a plane board 230 with a predetermined height (H) and width (W), and have colors different to each other, and side quadrangles 251 and 253 disposed on both sides of the plane board 230. As the third embodiment shown in FIG. 2A, in FIG. 2B, the shapes of the first through fourth polygons 241 through 247 are round and the number of polygons is 4, but the mark is not limited to this and the number of arbitrary polygons may be properly determined.

The artificial mark shown in FIGS. 1A, 1B, 2A and 2B may have different combinations of polygons' colors, depending on locations within the driving place. In the self-localizing apparatus and the self-localizing method according to the present invention, projection invariant information which is not affected by peripheral environments or noise upon extraction of location information is used, and accordingly, an accurate location can be determined even if the artificial mark image acquired by an autonomous vehicle is distorted.

Figure 3:
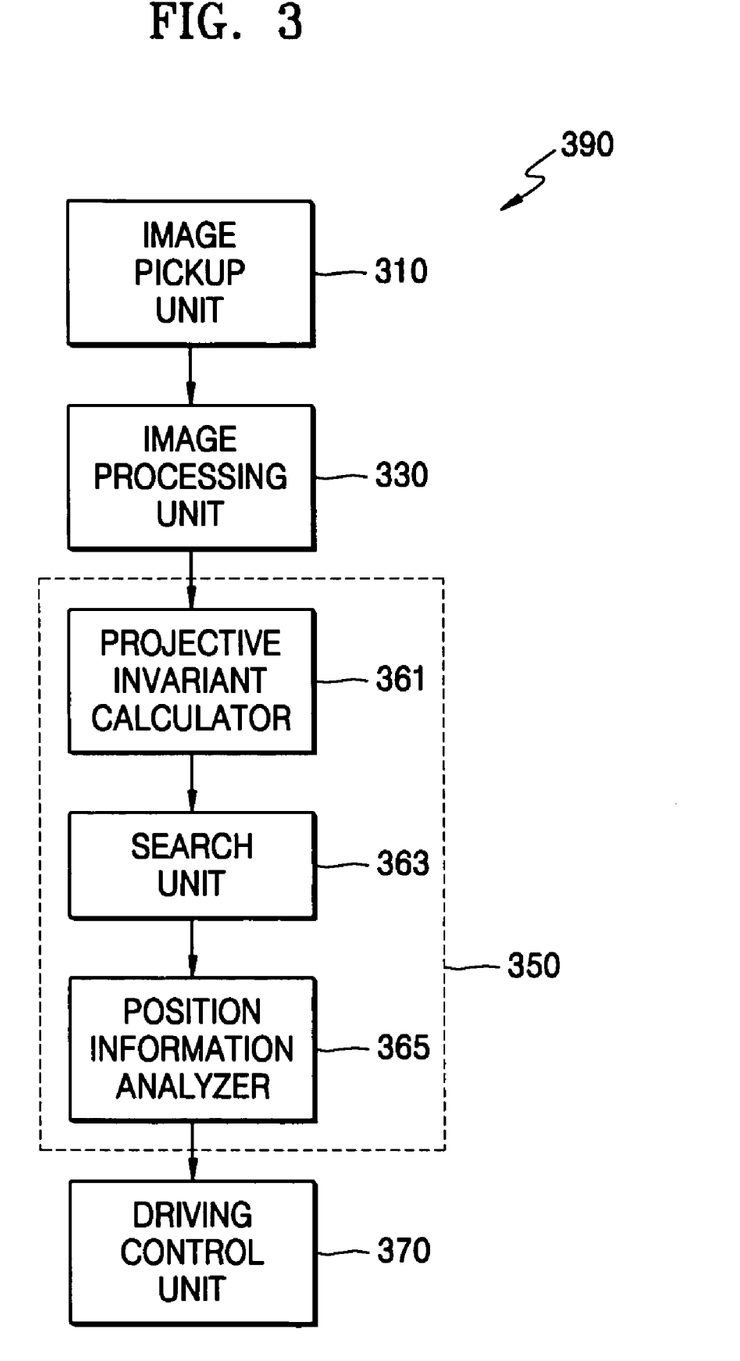
FIG. 3 is a block diagram showing the structure of an example of an intelligent system to which the present invention is applied.

FIG. 3 is a block diagram showing the structure of an example of an intelligent system to which the present invention is applied. The intelligent system is broadly formed with an image pickup unit 310, an image processing unit 330, a main control unit 350, and a driving control unit 370. Here, an example having a driving means such as driving wheels will be explained as an autonomous vehicle 390. The main control unit 350 includes a projective invariant calculator 361, a search unit 363, and a position information analyzer 365.

Referring to FIG. 3, the image pickup unit 310 may be a standard charge-coupled device (CCD) camera or a web camera in which an Internet server and a camera are combined. Web cameras generate distorted images quite frequently as compared with general CCD cameras, but can be easily popularized by virtue of their low prices. Because the autonomous vehicle 390 according to the present invention uses projection invariant information which is not affected by peripheral environments or noise upon recognition of a landmark, excellent recognition results can be obtained even if a low-priced web camera is used instead of an expensive CCD camera as the image pickup unit 310. Thus, self-localization of an autonomous vehicle can be economically accomplished. The image pickup unit 310 is installed on, for example, the top of the autonomous vehicle 390. The image pickup unit 310 takes images of a driving place, and provides the images taken to the image processing unit 330.

The image processing unit 330 detects an artificial mark used in the present invention, from the image provided by the image pickup unit 310. In the example of the artificial mark shown in FIG. 1A, the image processing unit 330 detects the plane board 110 containing the first through fifth polygons 121 through 129, from the taken image, based on Conditional Density Propagation (CONDENSATION) algorithm, and then detects the first through fifth polygons 121 through 129. The CONDENSATION algorithm is explained in detail by M. Isard and A. Blake in "Contour tracking by stochastic propagation of conditional density" in Eur. Conf. on Computer Vision (ECCV), pp. 343-356, 1996, and "Condensation-conditional density propagation for visual tracking" in International Journal of Computer Vision, 29 (1): 5-28, 1998. As such, the image processing unit 330 detects an artificial mark from the taken image and provides the coordinate values of the first through fifth polygons according to the detection result, to the main control unit 350. The detection algorithm of the artificial mark is not limited to the CONDENSATION algorithm and algorithms such as a line fitting or a circle fitting may be used.

The main control unit 350 performs an overall control action to operate the autonomous vehicle 390 and performs an algorithm based on a method of determining the position of the autonomous vehicle 390 according to the present invention. By using the coordinate values of the first through fifth polygons of the artificial mark provided by the image processing unit 330, the projective invariant calculator 361 calculates the projective invariant of the detected artificial mark. Thus, when the projective invariant is used, the artificial mark can be robustly recognized irrespective of a linear characteristic that can appear in a taken image, or the slope angle of the artificial mark.

The search unit 363 obtains a projective invariant of each individual artificial mark installed in a driving place of the autonomous vehicle 390, indexes a global location of the artificial mark in the driving place corresponding to the obtained projective invariant, and then stores a global location of the artificial mark and its projective invariant with the index, in a database in advance. By using the calculated projective invariant provided from the projective invariant calculator 361, the database is searched and the global location of the artificial mark in the driving place corresponding to the calculated projective invariant is obtained.

The position information analyzer 365 analyses the global location in the driving place and the direction angle of the autonomous vehicle 390 by using the global location in the driving place in which the detected artificial mark is disposed, and the distance information between the image pickup unit 310 and the detected artificial mark. By using the analyzed global location in the driving place and the direction angle of the autonomous vehicle 390, and based on a moving path program which is input in advance, the position information analyzer 365 determines the moving direction and speed of the autonomous vehicle 390, and provides the determined moving direction and speed as a moving command, to the driving control unit 370.

The driving control unit 370 controls the moving direction and speed of the autonomous vehicle 390 based on the moving command provided by the position information analyzer 365. That is, the control unit 370 provides a command to a driving apparatus, such as a driving motor, such that based on the moving path program input in advance, the autonomous vehicle 390 moves in the next position. By doing so, moving of the autonomous vehicle 390, such as going forward, backward, or changing direction, is controlled.

Figure 4:
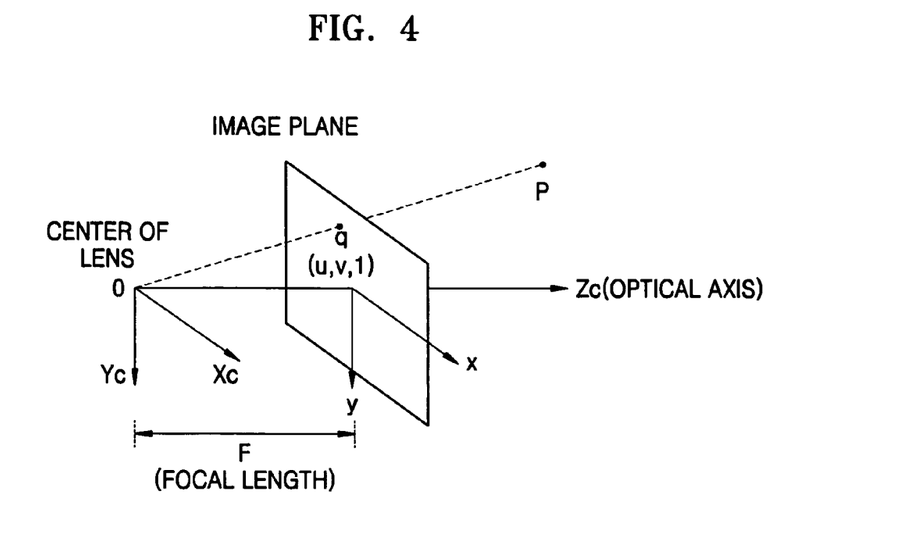
FIG. 4 is a view of a pin-hall camera model of the image pickup unit of FIG. 3.

FIG. 4 is a view of a pin-hall camera model of the image pickup unit 310 of FIG. 3. Referring to FIG. 4, a projective transformation for an image in the pin-hall camera model can be expressed as follows.

$$\begin{bmatrix} u \\ v \\ 1 \end{bmatrix} = \frac{1}{t_{31}X + t_{32}Y + t_{33}Z + t_{34}} \begin{bmatrix} t_{11} & t_{12} & t_{13} & t_{14} \\ t_{21} & t_{22} & t_{23} & t_{24} \\ t_{31} & t_{32} & t_{33} & t_{34} \end{bmatrix} \begin{bmatrix} X \\ Y \\ Z \\ 1 \end{bmatrix} \quad (1)$$

where (u, v, 1) denotes a coordinates of a point q defined on the image plane, (X, Y, Z, 1) denotes a coordinates of a point P in an object coordinate system, and $t_{ij}$ denotes an ij factor of a transformation matrix between an object plane and the image plane.

Here, if an object is projected to on a two-dimensional plane, i.e., Z=0, Equitation 1 is transformed as follows.

$$\begin{bmatrix} u \\ v \\ 1 \end{bmatrix} = \frac{1}{t_{31}X + t_{32}Y + t_{34}} \begin{bmatrix} t_{11} & t_{12} & t_{14} \\ t_{21} & t_{22} & t_{24} \\ t_{31} & t_{32} & t_{34} \end{bmatrix} \begin{bmatrix} X \\ Y \\ 1 \end{bmatrix} \quad (2)$$

As shown in Equations 1 and 2, the process for obtaining an image is performed in non-linear environment. However, a linear projective transformation can be applied to a two-dimensional image obtained through the image pickup unit 310 rather than a non-linear projective transformation like in Equation 2, as shown in FIG. 5.

Figure 5:
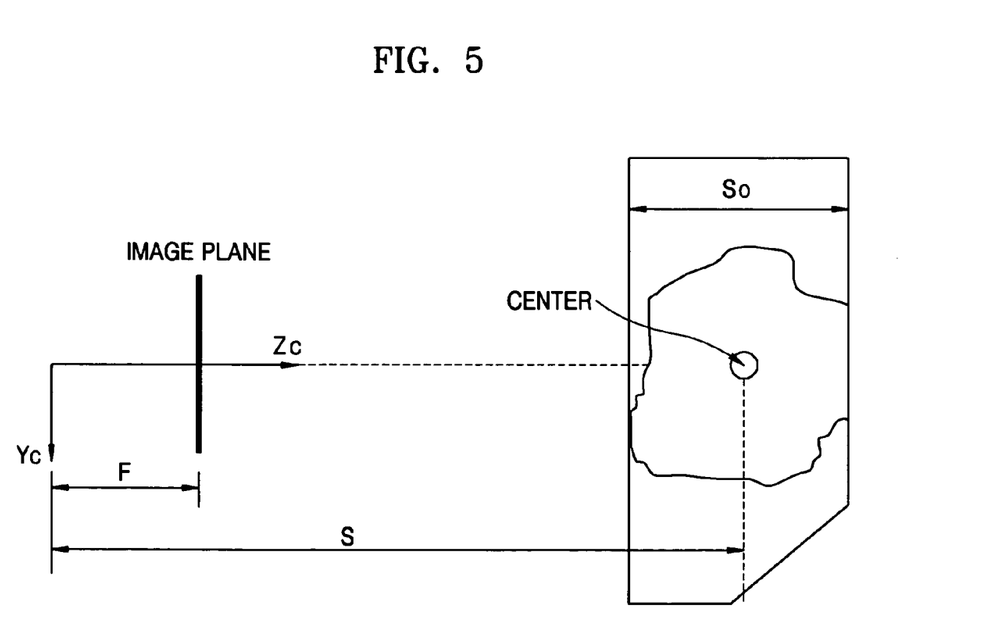
FIG. 5 is a view showing conditions to obtain a linear model of the image pickup unit of FIG. 3.

FIG. 5 is a view showing conditions to obtain a linear model of the image pickup unit 310 of FIG. 3. As shown in FIG. 5, if a length S from the image pickup unit 310 to the object is sufficiently longer than a size $S_0$ of the object, the non-linear projective transformation from like Equation 2 is transformed as follows.

$$\begin{bmatrix} u \\ v \\ 1 \end{bmatrix} \approx S \begin{bmatrix} t_{11} & t_{12} & t_{14} \\ t_{21} & t_{22} & t_{24} \\ t_{31} & t_{32} & t_{34} \end{bmatrix} \begin{bmatrix} X \\ Y \\ 1 \end{bmatrix} \quad (3)$$

A Fourier descriptor is a linearized shape descriptor which satisfies Equations 1, 2, and 3. The Fourier descriptor represents an image of the object with Fourier coefficients which are obtained by a two-dimensional Fourier transformation for the image contour of a two-dimensional object. However, this method can be applied only to a case where the linearity of the image pickup unit 310 is guaranteed, that is, where a distance between the image pickup unit 310 and the object is too long. Therefore, to overcome the restriction, the image obtained from the image pickup unit 310 is analyzed by using a projective invariant in the present invention. As a result, even in a case where the linearity of the image pickup unit 310 is not guaranteed, that is, the distance between the image pickup unit 310 and the object is not long, the image can be analyzed correctly without being affected by noise, slant angles, or the non-linearity of the image pickup unit 310 occurring when images are obtained.

Figure 6:
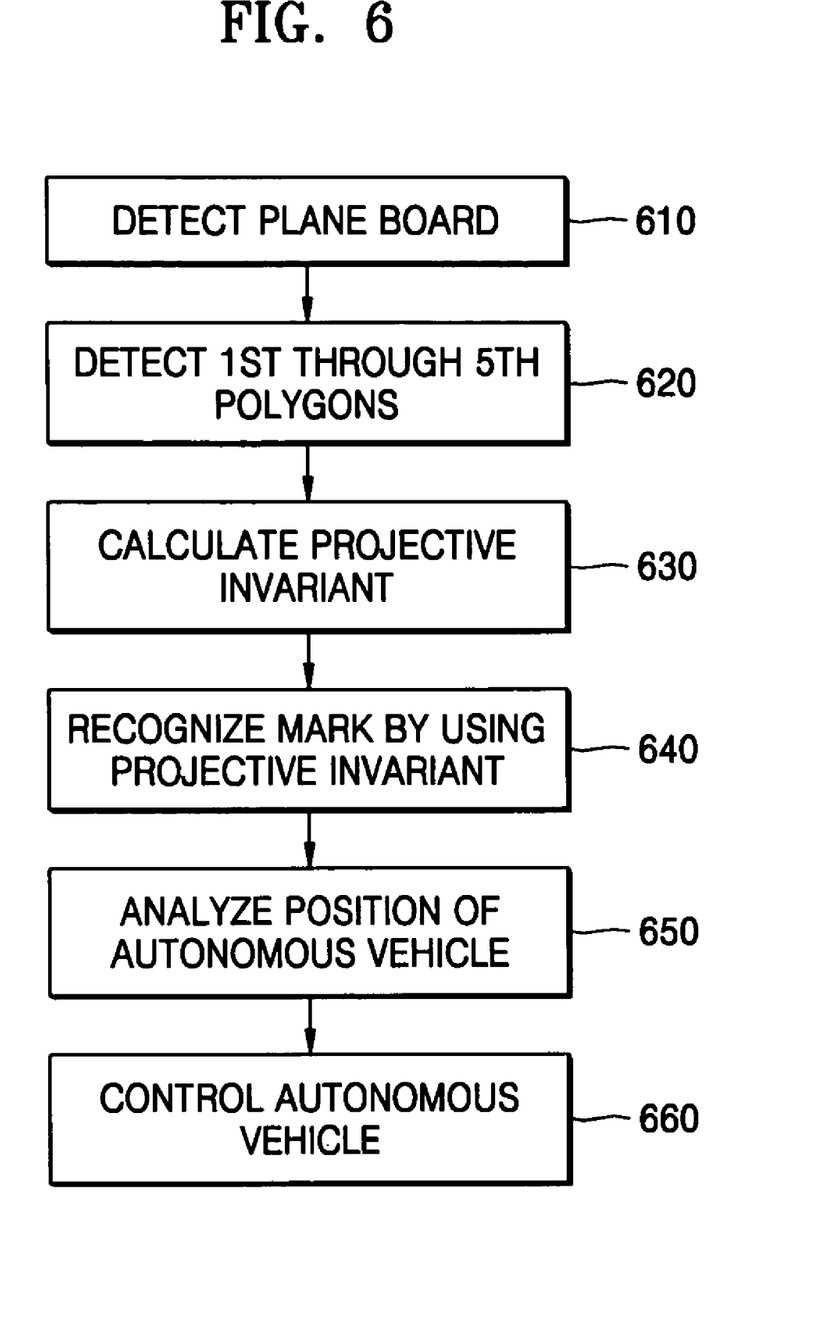
FIG. 6 is a flowchart of the steps performed by a position recognition method of an intelligent system according to the present invention.

FIG. 6 is a flowchart of the steps performed by a position recognition method of an intelligent system according to the present invention.

Figure 13:
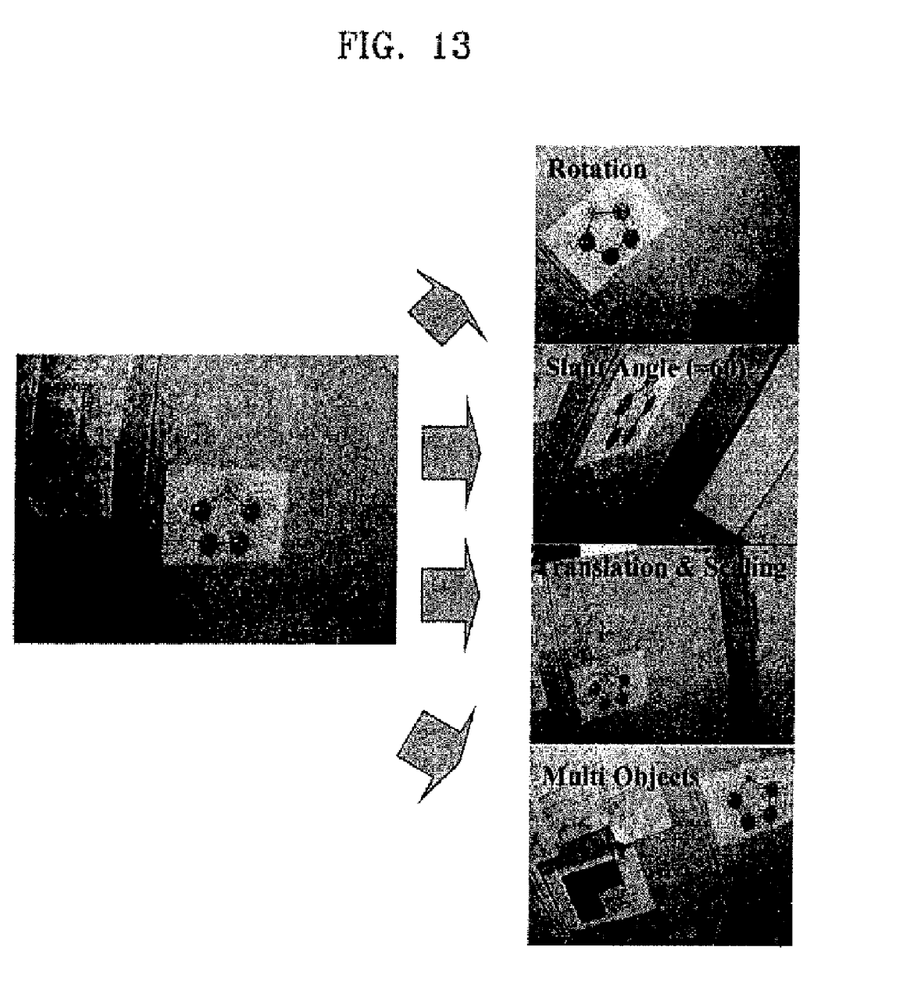
FIG. 13 is a diagram showing the results of detection by CONDENSATION algorithm when an artificial mark is rotated, slanted, translated, and scaled, and included in a plurality of objects.

Referring to FIG. 6, a quadrangle plane board indicating an artificial mark is detected in operation 610, and first through fifth polygons disposed in the quadrangle plane board are detected in operation 620. At this time, preferably, the CONDENSATION algorithm is used. Thus, when the CONDENSATION algorithm is used, the results of detection when an artificial mark is rotated, slanted, translated, and scaled, and included in a plurality of objects is shown in FIG. 13.

In operation 630, the projective invariant of the first through fifth polygon detected in the operation 620 is calculated. The projective invariant of X-axis can be calculated by det (·) value using X-axis coordinate values of the first through fifth polygons arranged 2-dimensionally, on an image plane and an object plane or by the crossing ratio of X-axis coordinate values of the first through fourth polygons arranged one-dimensionally, on an image plane and an object plane. Similarly, the projective invariant of Y-axis can be calculated by det (·) value using Y-axis coordinate values of the first through fifth polygons arranged 2-dimensionally, on an image plane and an object plane or by the crossing ratio of Y-axis coordinate values of the first through fourth polygons arranged one-dimensionally, on an image plane and an object plane.

In operation 640, the global location of the detected artificial mark is recognized by using the projective invariant calculated in the operation 630. For this, the index, projective invariant, and global location information in the driving place of each of shapes of artificial marks which are disposed at respective locations of the driving place in advance, are prepared in advance in a database.

In operation 650, by using the global location information in the driving place of the artificial mark recognized in the operation 640, and distance information between the image pickup unit 310 of the autonomous vehicle 390 and the artificial mark, the global location of the autonomous vehicle 390 is analyzed.

In operation 660, by using the location information of the autonomous vehicle 390 obtained in the operation 650, moving of the autonomous vehicle 390 is controlled along the preprogrammed moving path in a desired direction.

Figure 7:
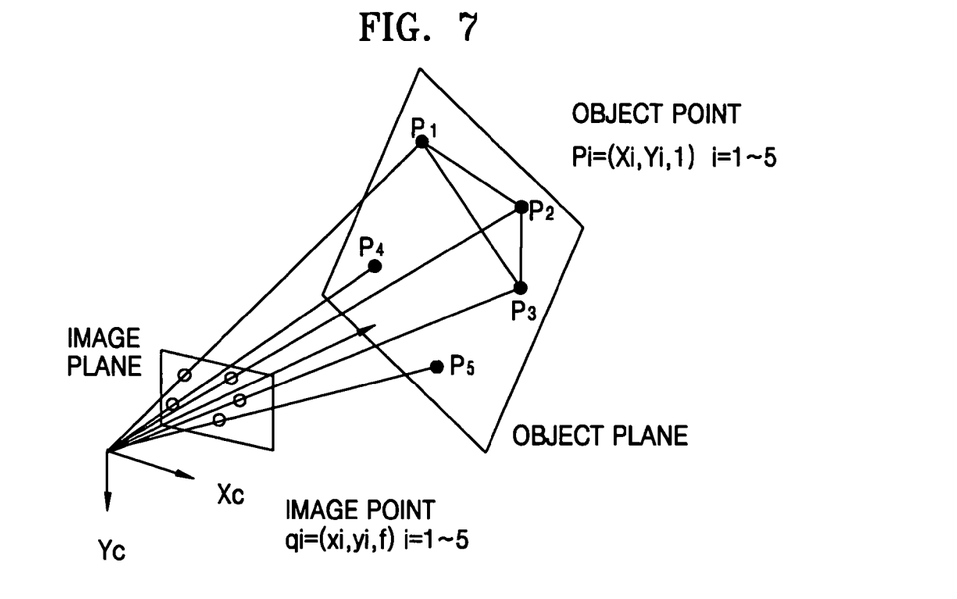
FIG. 7 shows a 2-dimensional artificial mark installed in a driving place, the coordinate system on a taken image, and the projective relation.

FIG. 7 shows a 2-dimensional artificial mark installed in a driving place, the coordinate system on a taken image, and the projective relation. A projective invariant I is calculated by using Equation 4:

$$I = \frac{\det(q_5 q_1 q_4)\det(q_5 q_2 q_3)}{\det(q_5 q_1 q_3)\det(q_5 q_2 q_4)} = \frac{\det(P_5 P_1 P_4)\det(P_5 P_2 P_3)}{\det(P_5 P_1 P_3)\det(P_5 P_2 P_4)} \quad (4)$$

wherein P denotes coordinates of a point indicating one of the first through fifth polygons, and q is coordinates of a point on a taken image corresponding to P (see FIG. 7). Det (·) in Equation 4 is defined as in Equation 5:

$$\det(q_1 q_2 q_3) = f \begin{bmatrix} x_1 & x_2 & x_3 \\ y_1 & y_2 & y_3 \\ 1 & 1 & 1 \end{bmatrix} \quad (5)$$

$$\det(P_1 P_2 P_3) = f \begin{bmatrix} X_1 & X_2 & X_3 \\ Y_1 & Y_2 & Y_3 \\ 1 & 1 & 1 \end{bmatrix} = 2^k (\text{Area of } \Delta P_1 P_2 P_3)$$

Here, f denotes a focal distance. A projective invariant calculated by the equation 4 is a value that is constant even under a nonlinear change, and can be effectively used for detection of an artificial mark.

Figure 9:
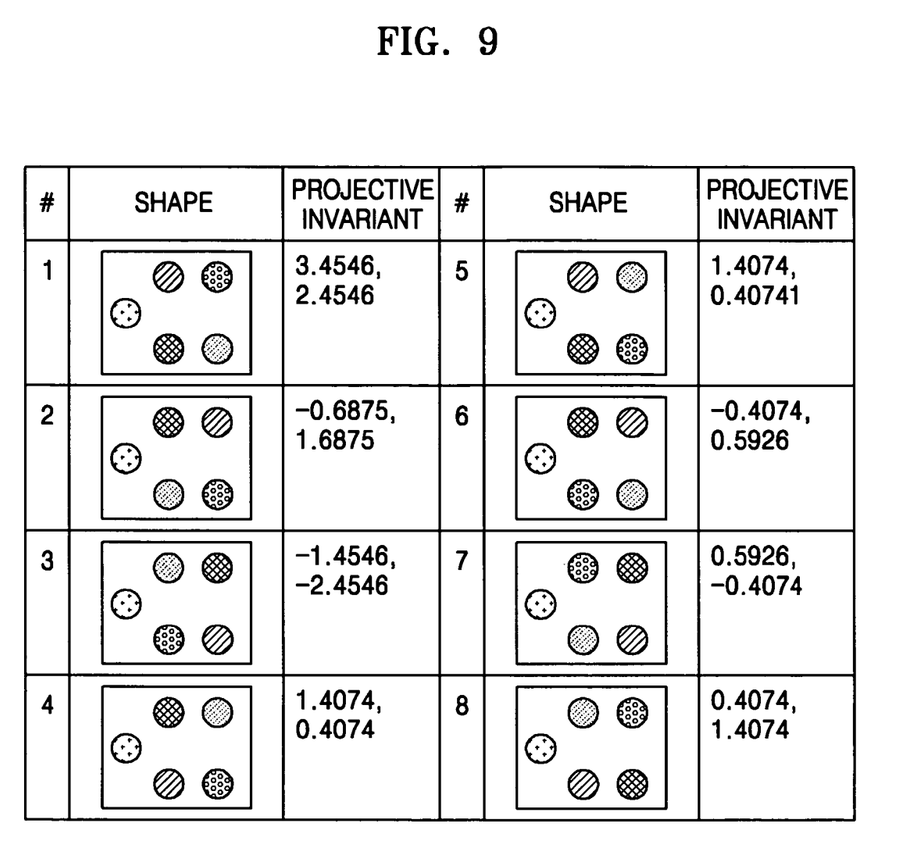
FIG. 9 is a diagram showing projective invariants with respect to shapes of artificial marks.

The projective invariants calculated by the equation 4 are shown in relation to the shapes of artificial marks in FIG. 9. FIG. 9 shows examples of 8 shapes.

Figure 8:
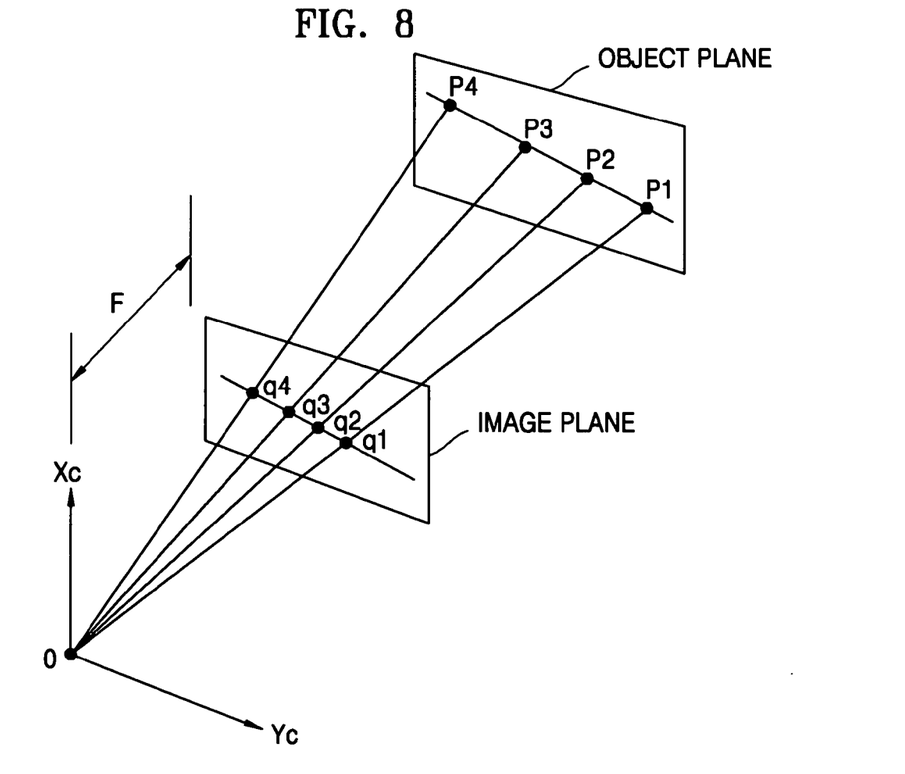
FIG. 8 shows a 1-dimensional artificial mark installed in a driving place, the coordinate system on a taken image, and the projective relation.

FIG. 8 shows a 1-dimensional artificial mark installed in a driving place, the coordinate system on a taken image, and the projective relation. At this time, the projective invariant (I($x_1$, $x_2$, $x_3$, $x_4$)) is expressed as Equation 6:

$$I = \frac{(x_1 - x_2)(x_3 - x_4)}{(x_1 - x_3)(x_2 - x_4)} = \frac{(X_1 - X_2)(X_3 - X_4)}{(X_1 - X_3)(X_2 - X_4)} \quad (6)$$

In Equation 6, ($X_1$, $X_2$, $X_3$, $X_4$) and ($x_1$, $x_2$, $x_3$, $x_4$) denote X-axis coordinate values of 4 points on straight lines defined on an object plane and on an image plane, respectively. Likewise, by applying the equation 6, projective invariant (I($y_1$, $y_2$, $y_3$, $y_4$)) can also be calculated.

That is, though the distance between two points changes under projective change, the projective invariant obtained by Equation 6 is a constant value and is used for recognition of an artificial mark.

Figure 10A:
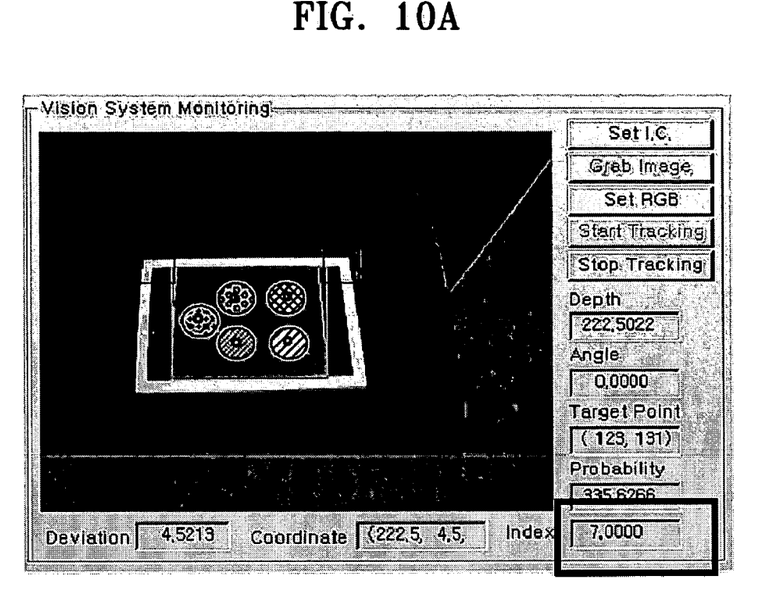
FIGS. 10A through 10D are diagrams showing the results of experiments of artificial mark recognition according to the present invention.
Figure 10B:
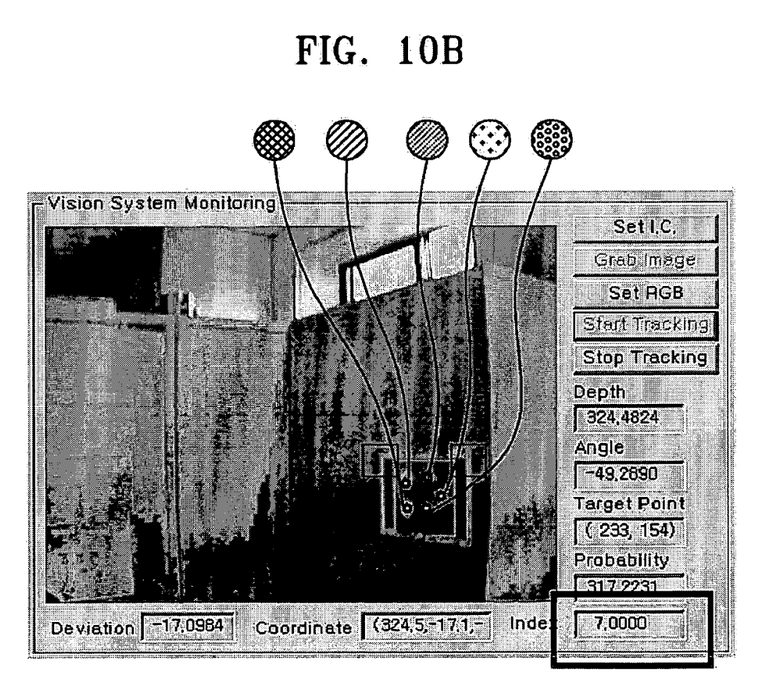
Figure 10C:
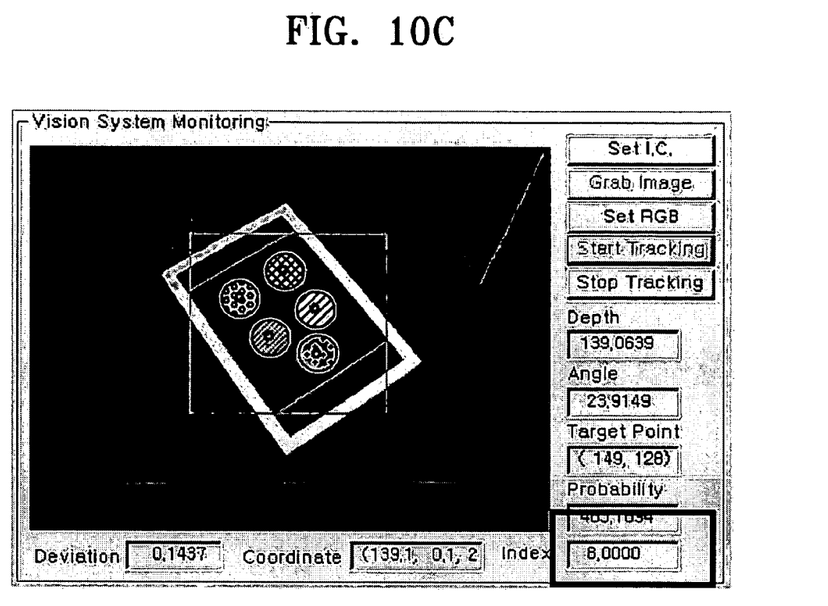
Figure 10D:
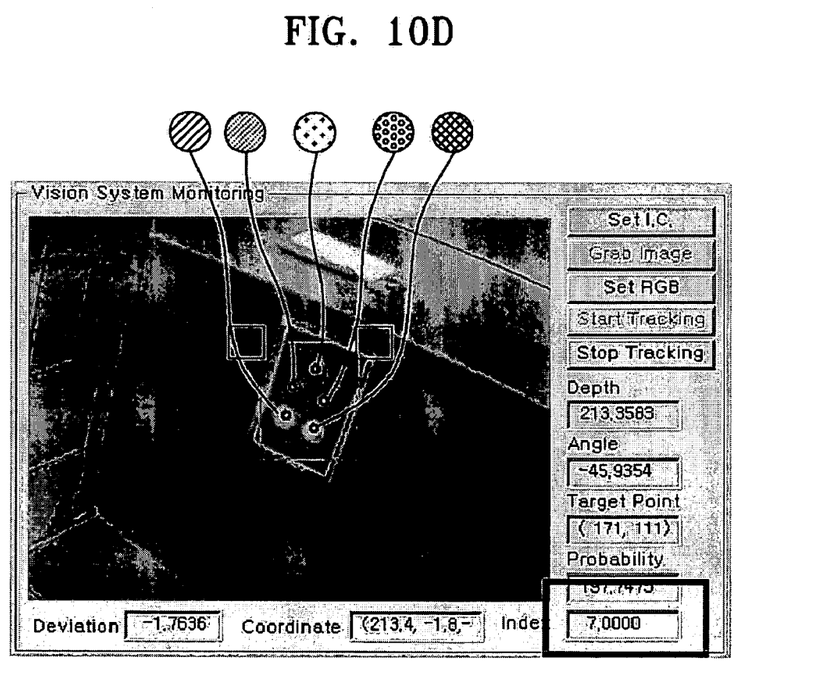

FIGS. 10A through 10D are diagrams showing the results of experiments of artificial mark recognition according to the present invention. The artificial mark shown in FIGS. 10A, 10B, and 10D is the seventh shape (#7) of artificial mark examples shown in FIG. 9, and the artificial mark shown in FIG. 10C is the eighth shape (#8) of artificial mark examples shown in FIG. 9. Thus, in an example of the artificial mark shown in FIG. 1B, with the plane board 130 formed as a large quadrangle, the depth, deviation, and angle between the image pickup unit 310 installed on the autonomous vehicle 390 and the artificial mark can be identified. With the side quadrangles 151 and 153, the direction in which the image pickup unit 310 installed on the autonomous vehicle 390 looks at the artificial mark can be identified.

Figure 11:
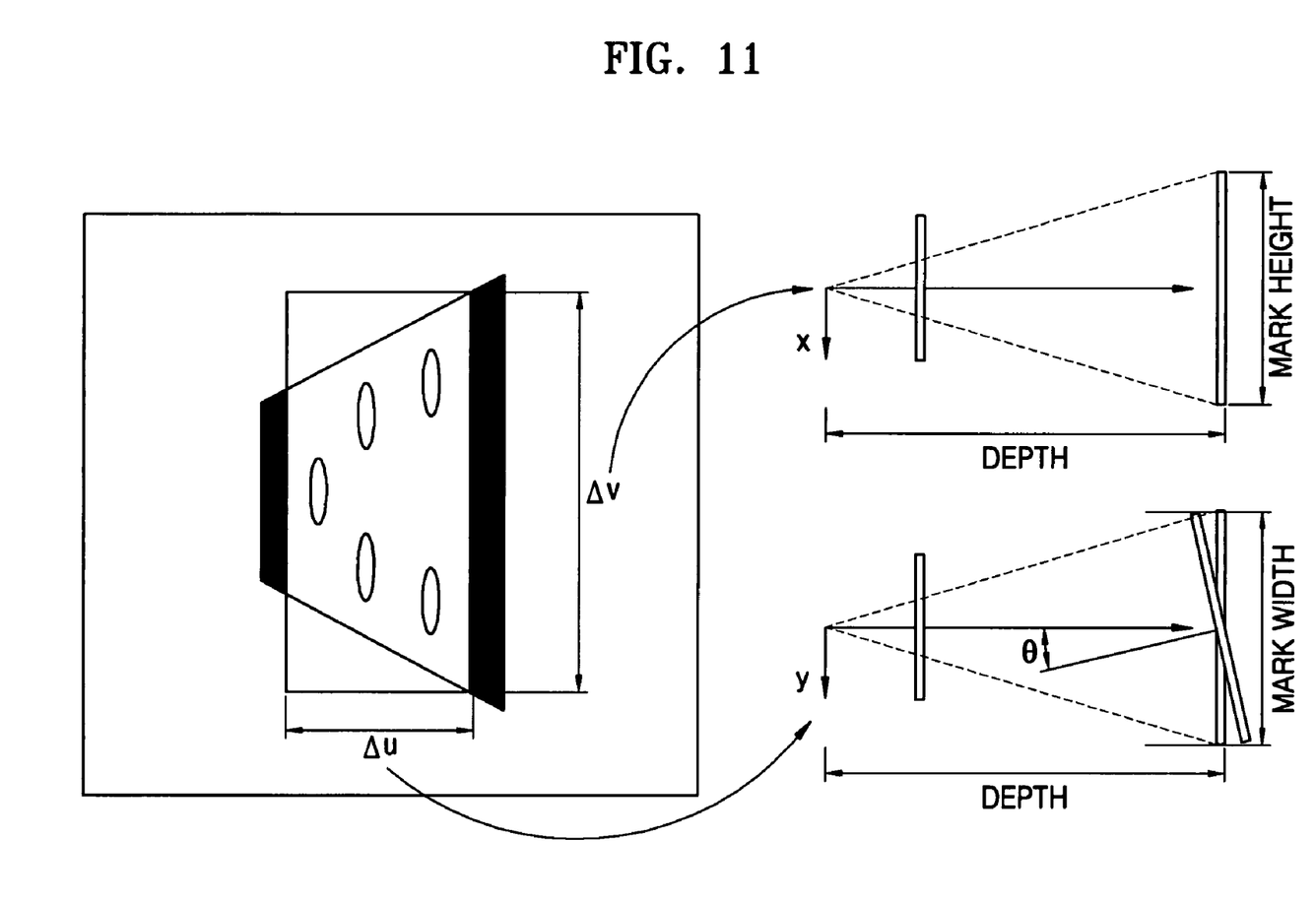
FIG. 11 is a diagram explaining an embodiment of a method for analyzing the location information of an autonomous vehicle in FIG. 6.

FIG. 11 is a diagram explaining an embodiment of a method for analyzing the location information of the autonomous vehicle in FIG. 6. The geometrical relation of the artificial mark and its taken image can be expressed by Equations 7 and 8:

$$\Delta v = f_y \frac{\text{Mark Height}}{\text{Depth}} \quad (7)$$

$$\text{Depth} = f_y \frac{\text{Mark Height}}{\Delta v}$$

$$\Delta u = f_x \frac{\text{Mark Width} \times \cos\theta}{\text{Depth}} \quad (8)$$

$$\cos\theta = \frac{\text{Depth} \times \Delta u}{f_x \text{ Mark Width}}$$

wherein Δu and Δv denote the width and height of the artificial mark detected in an image obtained by the image pickup unit 310, that is, a camera, respectively. $f_x$ and $f_y$ denote a scale factor which is defined by a specification of the camera or through a calibration process and by which a pixel unit in the image obtained by the image pickup unit 310 converts into a unit such as centimeter (cm). Also, mark height and mark width denote the width and height of the artificial mark disposed in a driving place, respectively. That is, the distance (depth) between the mark and the autonomous vehicle can be obtained from Equation 7, and the angle (cos Θ) in which the autonomous vehicle looks at the mark can be obtained from Equation 8.

Figure 12:
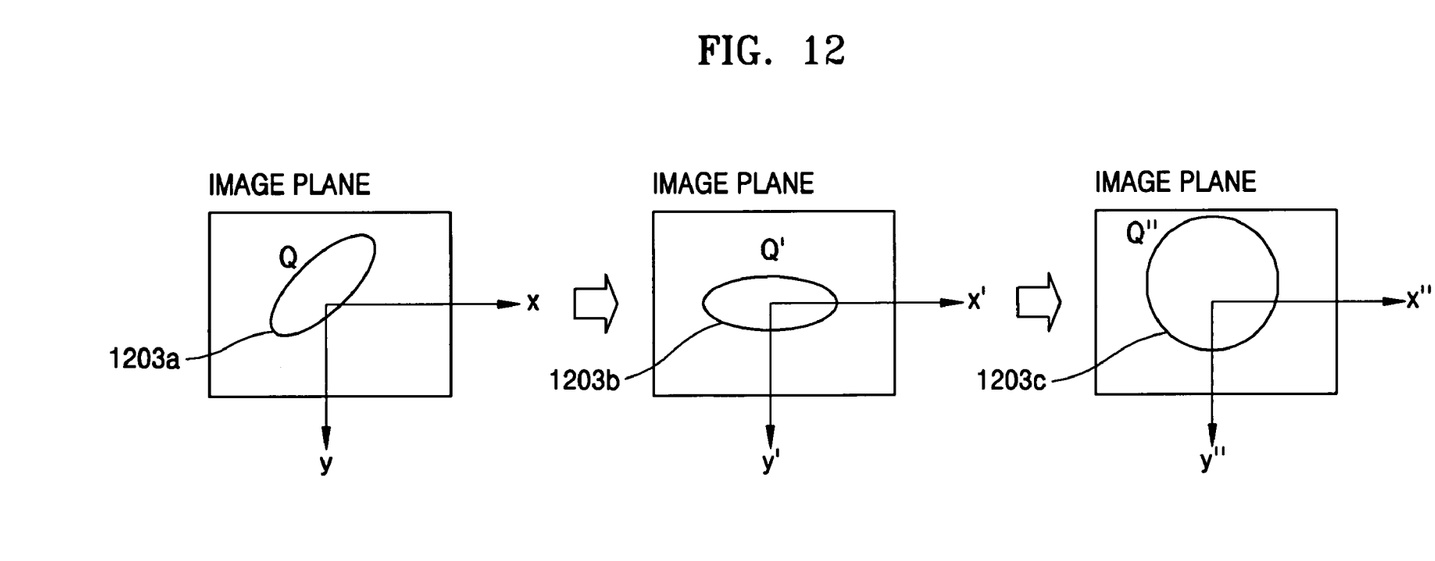
FIG. 12 is a diagram explaining another embodiment of a method for analyzing the location information of an autonomous vehicle in FIG. 6.

FIG. 12 is a diagram explaining another embodiment of a method for analyzing the location information of the autonomous vehicle in FIG. 6. That is, FIG. 12 shows a process of extracting information on the distance and orientation of an artificial mark with respect to the autonomous vehicle 390 from data on the first through fifth polygons 121 through 129 which are extracted from the artificial mark image projected by a camera.

Examples 1203a through 1203c of the first through fifth polygons 121 through 129 obtained from the artificial mark image acquired by a camera are shown in FIG. 12. Referring to FIG. 12, the shape of the first through fifth polygons 121 through 129 of the artificial mark can be a perfect circle 1203c, an oval 1203b, or an oval 1203a inclined by a predetermined angle because of the non-linearity of the camera.

Such a circular or oval figure can be expressed as in an equation of a quadratic section having two parameters x and y and is referred to as a conic section. A conic section including a perfect circle and an oval can be expressed in an implicit equation such as Equation 9:

$$S(x,y) = Ax^2 + 2Bxy + Cy^2 + 2(Dx + Ey) + F = 0 \quad (9)$$

A conic section projected by a camera, that is, a second oval outer line, can be expressed in a matrix format such as Equation 10:

$$Q = k \begin{pmatrix} A & B & D/f \\ B & C & E/f \\ D/f & E/f & F/f^2 \end{pmatrix} \quad (10)$$

wherein f denotes the focal length of the camera, and k denotes an arbitrary non-zero constant.

If a conic section expressed as in Equations 9 and 10 rotates around an arbitrary axis, the relationship between an arbitrary cubic equation (Q) and a cubic equation (Q') for the rotated conic section is expressed as in Equation 11:

$$Q' = k' R^T Q R \quad (11)$$

wherein R denotes a rotation matrix.

According to the relationship expressed in Equation 11, three-dimensional information (e.g., distance and orientation information) between an artificial mark and the autonomous vehicle 390 can be extracted when an artificial mark image is acquired by the autonomous vehicle 390.

If the first through fifth polygons 121 through 129 of an artificial mark has the oval shape 1203a inclined by a predetermined angle, the cubic equation for the oval shape 1203a is the same as Equation 10. If the oval shape 1203a is transformed into an oval located at a standard position as the oval 1203b of FIG. 12, the cubic equation (Q) for the oval 1203a expressed in Equation 10 is transformed into Equation 12:

$$Q' = k' \begin{pmatrix} 1 & 0 & 0 \\ 0 & \alpha & 0 \\ 0 & 0 & -\gamma/f^2 \end{pmatrix} \quad (12)$$

The relationship equation of two cubic equations Q and Q' is given by Equation 13:

$$Q' = k' U^T Q U \quad (13)$$

wherein U is equal to $[U_1, U_2, U_3]$ and denotes a matrix comprised of eigen vectors for an eigen value of a conic equation Q, $\lambda_1, \lambda_2, \lambda_3$.

A cubic equation used to transform an oval as the oval 1203b of FIG. 12 into a perfect circle as the perfect circle 1203c of FIG. 12 is given by Equation 14:

$$Q'' = k'' \begin{pmatrix} 1 & 0 & 0 \\ 0 & 1 & c/f \\ 0 & c/f & (c^2 - \rho^2)/f^2 \end{pmatrix} \quad (14)$$

The relationship equation between the cubic equation (Q) of the originally acquired landmark image and the finally-transformed cubic equation (Q'') is given by Equation 15:

$$Q'' = k'' R^T Q R \quad (15)$$

wherein R denotes a rotation transformation matrix for axis x'.

As described above, by transforming the cubic equation for a conic section (that is, the first through fifth polygons 121 through 129) extracted from an artificial mark image acquired by a camera, information on the orientation between an artificial mark and the autonomous vehicle 390 and information on the distance therebetween are obtained using the relationship equation between the cubic equation extracted from the original acquired artificial mark image and each of the transformed cubic equations Q' and Q''. The distance information between an artificial mark and the autonomous vehicle 390 is obtained using a normal vector (n') on the image plane where the perfect circle 1203c of FIG. 12 into which the oval 1203b is transformed, a vector (ct') to the center of the perfect circle 1203c, and a normal distance (d') to the center of the perfect circle 1203c. A normal vector (n) for the oval 1203a and a vector (ct) and a normal distance (d) to the center of the oval 1203a are obtained from the normal vector (n'), vector (ct'), and the normal distance (d') and expressed as in Equations 16, 17, and 18, respectively:

$$n = U R n' \quad (16)$$

$$ct = U R ct' \quad (17)$$

$$d = \lambda_1^{3/2} Y \quad (18)$$

wherein n' is $(0\ 0\ 1)^T$, ct' is $(0 - dc/f\ d)^T$, c is $\sqrt{(\alpha-1)(\gamma+f^2)}$, α is $$\frac{\lambda_2}{\lambda_1},$$

and γ is $$-f^2 \frac{\lambda_2}{\lambda_1}.$$

$c(=\sqrt{(\alpha-1)(\gamma+f^2)})$ denotes a value used to compensate for the difference between the center coordinate values of the perfect circle 1203c and the oval 1203b. Information on the distance between the artificial mark image acquired by a camera and the autonomous vehicle 390 can be obtained by tracing equations backward from the equation for the final perfect circle 1203c to the equation for the original oval 1203a.

While the present invention has been particularly shown and described with reference to exemplary embodiments concerning self-localization of autonomous vehicles such as mobile robots, the present invention is also applicable to image recognition and tracking performed in image application fields, such as automation systems, intelligent systems, and the like.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention as described above, artificial marks are formed with a plurality of polygons each having a different color and arranged one-dimensionally or 2-dimensionally and installed at arbitrary locations on a driving place. Then, by using the camera of an autonomous vehicle, the artificial mark is detected and recognized, and by using the recognized global location information of the artificial mark and the distance information between the camera and the artificial mark, the location of the autonomous vehicle is obtained. Accordingly, the time taken for detecting the artificial mark is very short. Also, since the artificial mark and the shape of the mark can be accurately detected even when there is a nonlinear characteristic in a taken image, separate manipulation of the camera of the autonomous vehicle is not needed in order to take the image of the artificial mark.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A device for determining a position of an intelligent system using an artificial mark comprising:
    means for calculating a projective invariant of an artificial mark detected from an image taken for a driving place;
    means for storing a database of indices, wherein the database includes a combination of colors of polygons included in the artificial mark, projective invariants of the artificial marks, and global location information of the artificial marks in the driving place, and searching the database by the calculated projective invariant for obtaining the global location information of the detected artificial mark; and
    means for determining the position of the intelligent system according to the global location information of the detected artificial mark and location information between the intelligent system and the detected artificial mark,
    wherein the means for calculating, the means for storing, and the means for determining constitute said device.

2. The device of claim 1, wherein the artificial mark is formed with a plane with a first color, and a plurality of polygons arranged in the plane with a form of one-dimension or two-dimension, having colors different from the first color and different to each other.

3. The device of claim 2, wherein the artificial mark further comprises areas on both sides of the plane, the areas having a color different from the colors of the plane and polygons.

4. The device of claim 1, wherein information on the orientation and distance of the intelligent system with respect to the detected artificial mark is obtained by using information on the height and width of the detected artificial mark, a scaling factor and the height and width of the artificial mark installed on the driving place.

5. The device of claim 1, wherein the real shape of polygons included in an artificial mark is a perfect circle and the shape of polygons included in the detected artificial mark is an oval, and because the real shape of the polygons included in the artificial mark is the perfect circle and the shape of polygons included in the detected artificial mark is the oval, an equation for a cubic section of the oval is transformed into a cubic section equation for the perfect circle and information on the orientation and distance of the intelligent system with respect to the detected artificial mark is obtained from the relationship equation between the two conic section equations.

* * * * *